United States Patent
Graybeal et al.

(10) Patent No.: US 9,081,078 B2
(45) Date of Patent: Jul. 14, 2015

(54) TECHNIQUE FOR EFFECTIVELY COMMUNICATING LOCATION INFORMATION IN A WIRELESS COMMUNICATION SERVICE

(75) Inventors: John M. Graybeal, Califon, NJ (US); Amit Mukhopadhyay, Westfield, NJ (US); Susan Wu Sanders, Bridgewater, NJ (US); Carl Francis Weaver, Morris Plains, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 890 days.

(21) Appl. No.: 12/698,243

(22) Filed: Feb. 2, 2010

(65) Prior Publication Data

US 2011/0187599 A1     Aug. 4, 2011

(51) Int. Cl.
*G01S 3/02* (2006.01)
*G01S 5/00* (2006.01)
*G01S 5/02* (2010.01)

(52) U.S. Cl.
CPC ..... *G01S 5/0036* (2013.01); *G01S 5/02* (2013.01)

(58) Field of Classification Search
CPC ................................ G01S 5/02; G01S 5/0036
USPC ........................................................ 342/458
See application file for complete search history.

(56) References Cited

U.S. PATENT DOCUMENTS

| | | | | |
|---|---|---|---|---|
| 4,680,590 A | * | 7/1987 | Lowe et al. | 342/457 |
| 4,698,781 A | * | 10/1987 | Cockerell, Jr. | 342/463 |
| 4,701,760 A | * | 10/1987 | Raoux | 340/993 |
| 5,214,757 A | * | 5/1993 | Mauney et al. | 715/751 |
| 5,528,518 A | * | 6/1996 | Bradshaw et al. | 702/150 |
| 5,542,100 A | * | 7/1996 | Hatakeyama | 455/404.2 |
| 6,043,777 A | | 3/2000 | Bergman et al. | |
| 6,204,808 B1 | * | 3/2001 | Bloebaum et al. | 342/357.42 |
| 6,211,819 B1 | * | 4/2001 | King et al. | 342/357.66 |
| 6,748,224 B1 | * | 6/2004 | Chen et al. | 455/456.1 |
| 2002/0002053 A1 | | 1/2002 | Nam et al. | |
| 2002/0193108 A1 | * | 12/2002 | Robinett | 455/427 |
| 2003/0137453 A1 | * | 7/2003 | Hannah et al. | 342/387 |
| 2004/0147244 A1 | * | 7/2004 | Raisanen | 455/404.2 |
| 2005/0048921 A1 | * | 3/2005 | Chung | 455/63.4 |
| 2009/0082992 A1 | * | 3/2009 | Green et al. | 702/152 |
| 2009/0323121 A1 | * | 12/2009 | Valkenburg et al. | 358/1.18 |

FOREIGN PATENT DOCUMENTS

| | | |
|---|---|---|
| EP | 1207404 A1 | 5/2002 |
| WO | WO0028347 A1 | 5/2000 |
| WO | WO03/021286 A2 * | 3/2003 |

OTHER PUBLICATIONS

Wikipedia Article, "Cellular Network", Jan. 14, 2009 version.*
PCT International Search Report, PCT/US2011/023261, International filing date Feb. 1, 2011.

* cited by examiner

*Primary Examiner* — Frank J McGue
(74) *Attorney, Agent, or Firm* — C. Bilicska

(57) ABSTRACT

In providing a wireless location communication service including a location based service to a user of a mobile device, the mobile device sends information concerning a location of the device relative to a given position in a wireless communication system. The given position may be that of a base station in the system. First information concerning a location of the base station (e.g., GPS information) is communicated to the mobile device, e.g., via broadcast. The mobile device determines second information concerning its location, e.g., based on signals from GPS satellites received thereby. The mobile device then generates relative location information based at least on the first and second information.

18 Claims, 3 Drawing Sheets

TECHNIQUE FOR EFFECTIVELY COMMUNICATING LOCATION INFORMATION IN A WIRELESS COMMUNICATION SERVICE

FIELD OF THE INVENTION

The invention relates to a technique for providing a wireless communication service and, more particularly, to a technique for communicating location information in a certain format in one such service.

BACKGROUND OF THE INVENTION

This section introduces aspects that may help facilitate a better understanding of the invention. Accordingly, the statements of this section are to be read in this light and are not to be understood as admissions about what is prior art or what is not prior art.

The marriage of wireless communication services and location based services has been observed. For example, in the United States, the "E911" mandate requires that a wireless service provider automatically obtain information concerning a location of a wireless caller calling for emergency help, i.e., without the caller having to provide the location information, and route the call to the appropriate emergency responder for the caller's location. Such E911 service is important in times of fires, break-ins, kidnapping, and other events where communicating one's location is difficult or impossible. To facilitate the E911 service, more and more mobile devices (e.g., mobile phones) have been "global positioning system (GPS) enabled" by incorporating therein a GPS receiver for receiving signals from GPS satellites to determine the devices' location.

However, a GPS enabled mobile device when used indoors or other non-optimal settings, where the line of sight to the GPS satellites is obstructed or interfered, oftentimes cannot effectively provide GPS information concerning its location. To help a mobile device with effective location acquisition, especially on power up of the mobile device, a well known assisted GPS (A-GPS) service has been deployed by wireless service providers which, for example, may supply through a data channel to the mobile device orbital, clock and other data about the GPS satellites relevant to the mobile device. The wireless service providers have base stations installed therein GPS receivers receiving signals from the GPS satellites. Based on the received satellite signals, the orbital, clock and other data, including GPS information about a base station's own location, can be computed. A base station may pass the computed information to the mobile devices served thereby to realize the A-GPS.

Many location based services involving mobile devices have emerged since the E911 initiative, which include, for instance, a chaperon service whereby a parent may be informed of a location of a child carrying a mobile device, e.g., whether the child has exited or entered a geographic area previously defined by the parent. Recently, the ability of a mobile device to provide GPS location information fueled proliferation of such location based services as targeted advertising, and customized traffic, map, weather and other services based on the current location of the device. Wireless service providers would also benefit from the location information from mobile devices using their services, e.g., to dynamically optimize their network capacity to better serve wireless customers in crowded areas.

BRIEF SUMMARY

As more and more location based services in the wireless communication arena are in the offing, and more and more mobile devices will need to communicate GPS location information to take advantage of these services, a significant strain is anticipated on the capacity of a wireless communication system, especially its radio access portion, resulting from the mobile devices communicating an increasing amount of GPS location information over the air, thereby undesirably degrading the performance of the wireless communication service. In accordance with an embodiment of the invention, a mobile device is capable of receiving via a wireless medium first information, concerning a location of a given position in the wireless communication system. For example, the given position may be the position of a base station serving the mobile device. The mobile device may rely on a location device including, e.g., a GPS device, to provide second information, concerning a location of the mobile device. The mobile device generates data concerning a location of the device relative to the given position based at least on the first and second information.

In one embodiment, the mobile device sends the relative location data to the wireless communication system to realize a location based service, thereby utilizing reduced over-the-air bandwidth relative to sending the otherwise GPS location information as would be the conventional case. Advantageously, such bandwidth saving allows more frequent communications by a mobile device of its relative location data to the wireless communication system to fully benefit from the location based service.

DETAILED DESCRIPTION

The ability of a mobile device to provide GPS information concerning its location has fueled proliferation of such location based services as targeted advertising, and customized traffic, map, weather and other services based on the current location of the device. Typically, a mobile device provides the GPS location information upon request by a location server in a wireless communications system. Such a location information request is kept infrequent so that the capacity of the system, especially its radio access portion, is not significantly strained from mobile devices' responses to such a request. However, as more and more location based services in the wireless communications arena are in the offing, and more and more mobile devices will need to communicate GPS location information to take advantage of these services, a significant strain on the wireless communication system capacity is anticipated, resulting from mobile devices' communicating an increasing amount of GPS location information over the air, thereby undesirably degrading the performance of the wireless communication service.

In accordance with an embodiment of the invention, to effectively utilize the limited radio-access capacity of a wireless communication system, the location information to be communicated by a mobile device over the air should no longer be in the conventional GPS format. The latter typically includes longitude and latitude measures each expressed in the form of ddd:mm:ss.sss with an East/West or a North/South indicator, where d stands for degrees; m stands for minutes; and s stands for seconds. Rather, in accordance with the embodiment the location information to be communicated should be representative of the location of the mobile device relative to a known reference point or position in the wireless communication system. For example, the reference position may be the location of a base station in the system which serves the mobile device. Such a reference position is convenient particularly if the base station has already incorporated therein a GPS engine including a GPS receiver which is afforded a good line-of-sight of the GPS satellites. The GPS engine is capable of computing the GPS location of the base station and other data, e.g., for A-GPS purposes based on GPS signals received from the satellites. More importantly, the amount of data needed to represent the relative location of a mobile device in this manner is substantially (about 200%) less than that representing latitude and longitude measures as in the conventional GPS format. Advantageously, with the invention, mobile devices may be programmed to communicate automatically (as opposed to being upon request) their relative location information on a regular basis to effectively utilize the location based services, without significantly degrading the performance of the wireless communication service.

Figure 1:
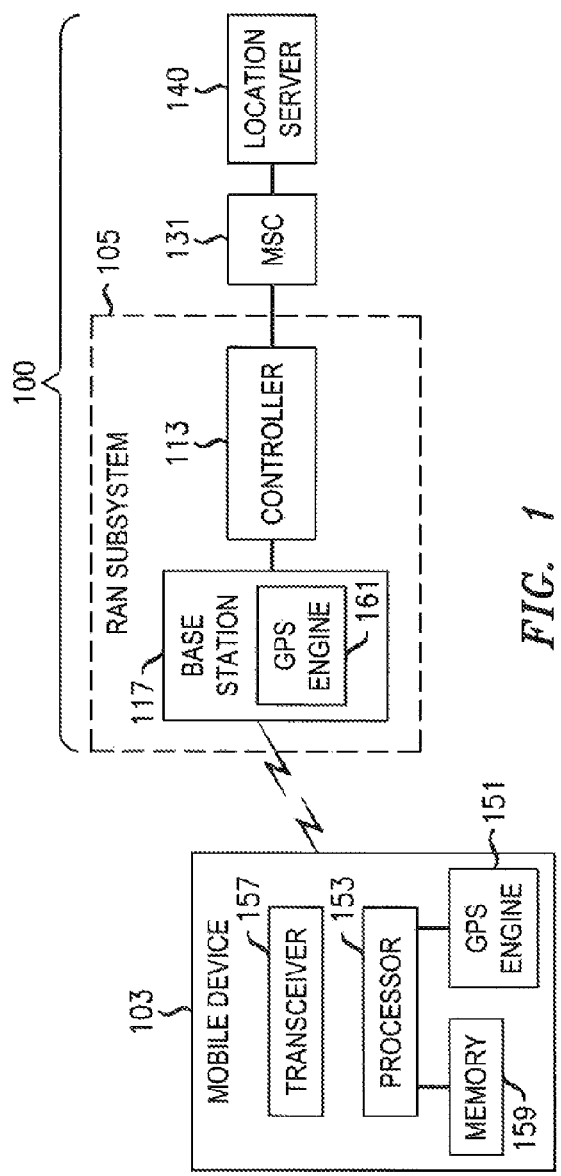
FIG. 1 is a block diagram of a wireless communication system according to an embodiment of the invention.

FIG. 1 illustrates wireless communication system 100 embodying the principles of the invention, and a representative mobile communication device, denoted 103. Device 103 may be a mobile phone, smart phone, iPhone®, personal digital assistant (PDA), Blackberry®-type device, Kindle™-type device, notebook or netbook computer, pocket personal computer (PPC), hand-held or portable device, etc. which is capable of wireless communications, and which may be incorporated in a system in a vehicle or mobile environment, e.g., in a car, an airplane, etc. A subscriber may use device 103 to access a wireless communication service provided by system 100 through radio access network (RAN) subsystem 105. The latter includes at least one base station 117 and controller 113.

Where, for example, the wireless communication service is provisioned by system 100 according to a global system for mobile communications (GSM) standard, RAN subsystem 105 includes wireless facilities and channels for a GSM/EDGE radio access network (GERAN). Controller 113 may then be a so-called "base station controller (BSC)" which, among other things, controls operations of base station 117 in a well known manner to carry out the GSM service. As is well known, base station 117 includes a transmitter (not shown) and a receiver (not shown) for communications with mobile devices served thereby. It establishes physical radio connections with mobile devices, e.g., device 103, accessing the wireless communication service including location based services.

Where, for example, the wireless communication service is provisioned by system 100 according to a universal mobile telecommunication system (UMTS) standard, RAN subsystem 105 includes wireless facilities and channels for a UMTS terrestrial radio access network (UTRAN), controller 113 may then be a so-called "radio network controller (RNC)" which, among others things, controls operations of base station 117 a well known manner to carry out the UMTS service. Base station 117 may also be known as a node B according to the UMTS standard.

It should be noted at this point that the present invention may also be applied to other types of wireless communication service including, but not limited to, a $4^{th}$ generation (4G) wireless communication service provisioned according to a long term evolution (LTE) standard.

In a well known manner, mobile switching center (MSC) 131 administers the wireless communication service. MSC 131 is capable of, among other things, originating and terminating a circuit switched connection between a mobile communications device (e.g., device 103) and another device via an external network (not shown), e.g., a public switched telephone network (PSTN), internet protocol (IP) network, microwave network, satellite network, cable network, optical fiber network, etc., or a combination thereof. MSC 131 in this instance is connected to location server 140, e.g., via an intranet. Location server 140 is the intended receiver of the location information from a mobile device, and is instrumental to providing, in a well known manner, such location based services the aforementioned E911 service; chaperon service; targeted advertising; customized traffic, map, weather and other services based on the received location information indicating the current location of the mobile device.

In one embodiment, mobile device 103 includes, among other things, GPS engine 151, processor 153, transceiver 157 and memory 159. GPS engine 151 includes a GPS receiver for receiving signals from the GPS satellites. GPS engine 151, perhaps with the help of A-GPS, calculates in a well known manner the GPS coordinates of device 103 in terms of latitude and longitude. The resulting GPS coordinates $(LT, LG)_{device}$ indicating the location (also known as a "geolocation") of the device is stored in memory 159. As fully disclosed below, processor 153 in this embodiment uses $(LT, LG)_{device}$ to determine the corresponding relative coordinates $(\alpha, \beta)$ indicating the location of device 103 relative to the location of base station 117 serving device 103. The latter location is determined by GPS engine 161 in base station 117 whose location indicated by GPS coordinates $(LT, LG)_{base}$ is provided to device 103 in a manner described below. Processor 153 converts the relative coordinates $(\alpha, \beta)$ into a "base station assisted location format" in accordance with an embodiment to be described. Processor 153 causes transceiver 157 to transmit a radio frequency (RF) signal containing data concerning the relative coordinates to RAN subsystem 105 to inform system 100 of the relative location of device 103.

Figure 2:
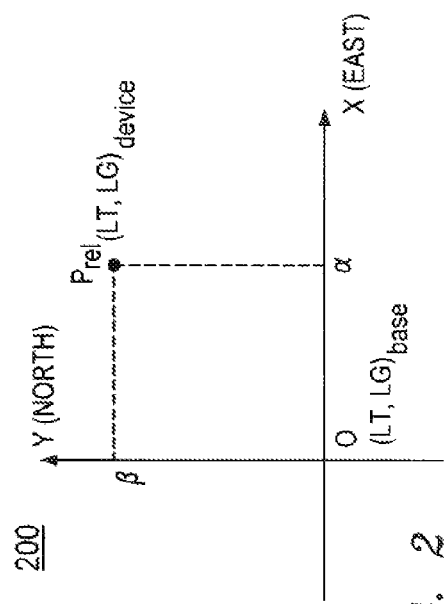
FIG. 2 is a Cartesian coordinate plane for use to illustrate a translation of the GPS location of a mobile device to its relative location to a base station in the system of FIG. 1.

FIG. 2 illustrates the derivation of relative coordinates $(\alpha, \beta)$ from the location of device 103 defined by $(LT, LG)_{device}$ and the location of base station 117 defined by $(LT, LG)_{base}$. As shown in FIG. 2, a Cartesian coordinate plane denoted 200 is defined by X- and Y-axes, where the X-axis in this instance is directed towards the East, while the Y-axis perpendicular thereto is directed towards the North. The origin O indicates the location of base station 117 at $(LT, LG)_{base}$. Point $P_{rel}$ on plane 200 indicates the location of mobile device at $(LT, LG)_{device}$, and defines the relative coordinates $(\alpha, \beta)$ with respect to O, where $\alpha$ represents a signed distance from the Y-axis, e.g., in meters, with a being a positive value if $P_{rel}$ is east of the Y-axis and a negative value if $P_{rel}$ is west of the Y-axis; and $\beta$ represents a signed distance from the X-axis, e.g., in meters, with $\beta$ being a positive value if $P_{rel}$ is north of the X-axis and a negative value if $P_{rel}$ is south of the X-axis.

Figures 3, 4:
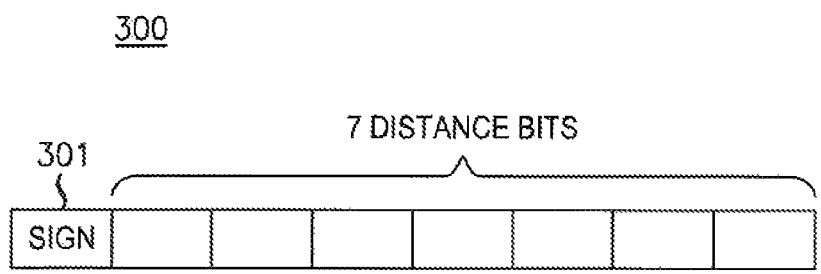
FIG. 3 illustrates a format of a data byte representing a coordinate value of the relative location of a mobile device indicated on the coordinate plane of FIG. 2.
FIG. 4 is a table including bit representations of different distance values for use in the data byte of FIG. 3.

In one embodiment, processor 153 digitizes signed distances $\alpha$ and $\beta$ to form X-byte and Y-byte, respectively, in accordance with the aforementioned "base station assisted location format." FIG. 3 illustrates the data format denoted 300 for the X- and Y-bytes. As shown in FIG. 3, the most significant bit (MSB) 301 of X-(Y-) byte is used to indicate the sign of α(β), with MSB=1 if α(β) is a positive value, and MSB=0 if α(β) is a negative value. The remaining 7 bits of the data byte are used to represent one of $2^7$=128 different distance values. In one embodiment, base station 117 broadcasts a distance resolution to mobile devices in a cell served thereby. The distance resolution defines an incremental distance corresponding to each incremental distance bit value. The lesser the distance resolution, the longer range coverage the 7 distance bits can offer. For example, with a 5-meter resolution, the 7 distance bits can be used to represent $\|\alpha\|$ ($\|\beta\|$), in increments of 5 meters, up to 128×5=640 m from a base station. A lesser, 10-meter resolution may be used to increase the range coverage from the base station to about 1,280 m. The desired range coverage may be a function of the radius of the cell served by the base station.

Given a distance resolution, say, 10-meter resolution, processor 153 quantizes $\|\alpha\|(\|\beta\|)$. To that end, processor 153 in this instance rounds $\|\alpha\|(\|\beta\|)$ to the nearest multiple of 10. Specifically, processor 153 in this instance rounds $\|\alpha\|(\|\beta\|)$ to the immediately higher multiple of 10 if the unit digit of $\|\alpha\|(\|\beta\|)$ is greater than or equal to 5. Otherwise if its unit digit is smaller than 5, $\|\alpha\|(\|\beta\|)$ is rounded to the immediately lower multiple of 10. That is, in this instance RND(14)=10 and RND(25)=30, where RND denotes the rounding operation performed by processor 153. Continuing the example, processor 153 maps the rounded $\|\alpha\|(\|\beta\|)$ value to a 7-distance-bit representation according to table 400 in FIG. 4. As shown in FIG. 4, a rounded value 10 in this instance is mapped to a bit representation 0000001, as indicated in row 401; a rounded value of 20 is mapped to a 7-bit representation 0000010, as indicated in row 402; . . . and a rounded value of 1,280 is mapped to a bit representation 1111111, as indicated in row 411.

After forming the X-byte and Y-byte representing the location of device 103 relative to base station 117, processor 153 causes transceiver 157 to transmit an RF signal containing those data bytes and information concerning an identification (ID) of device 103 (e.g., mobile identification number (MIN)). After receiving the RF signal through base station 117, controller 113 processes the signal content including the X-byte and Y-byte and the mobile device ID information in a manner described fully below. It suffices to know for now that controller 113 recovers (LT, LG)$_{device}$ based, in part, on the received X- and Y-bytes.

Figure 5:
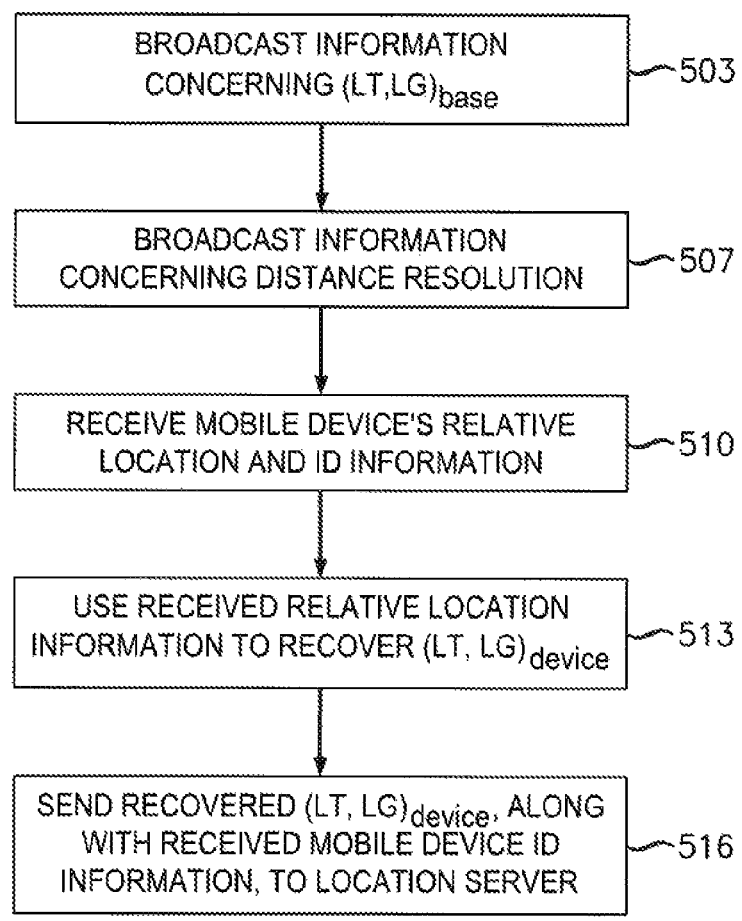
FIG. 5 is a flow chart depicting a process performed in a radio access network subsystem in the system of FIG. 1.

In one embodiment, under the control of controller 113, base station 117 broadcasts information concerning (LT, LG)$_{base}$ obtained from GPS engine 161, as indicated at step 503 in FIG. 5, which is receivable by mobile device 103 within the cell served by base station 117. At step 507, base station 117 broadcasts information concerning the aforementioned distance resolution, e.g., the 10-meter resolution, through it transmitter. After receiving the broadcast of the (LT, LG)$_{base}$ and distance resolution information, each mobile device in the cell, like device 103, may determine its location relative to base station 117 and the corresponding X-byte and Y-byte in the manner fully described before. The mobile device may automatically, or upon request, transmit an RF signal containing the X- and Y-byte relative location information, and its ID to base station 117. After receiving the mobile device's relative location and ID information through the receiver of base station 117, as indicated at step 510, controller 113 uses the received relative location information to recover (LT, LG)$_{device}$ of the mobile device, as indicated at step 513. The recovery of (LT, LG)$_{device}$ is realized by reversing the above-described process by processor 153 in obtaining the X- and Y-bytes. Specifically, controller 113 maps the respective 7-distance-bit representations of the received X- and Y-bytes to the corresponding rounded or quantized $\|\alpha\|$ and $\|\beta\|$ according to table 400. It should be noted at this point that the quantized $\|\alpha\|$ and $\|\beta\|$ may not be identical to the original $\|\alpha\|$ and $\|\beta\|$ because of the above-described rounding operation (RND), and as a result the eventual, recovered (LT, LG)$_{device}$ would be subject to a quantization error, which varies inversely with the distance resolution. In any event, controller 113 recovers α and β based on the quantized $\|\alpha\|$ and $\|\beta\|$ and the signs indicated by the MSBs of the received X- and Y-bytes, respectively. Controller 113 obtains (LT, LG)$_{base}$ from GPS engine 161, and recovers (LT, LG)$_{device}$ based on (LT, LG)$_{base}$ and (α,β) whose inter-relationship is shown in FIG. 2. At step 516, controller 113 in a conventional manner sends the recovered (LT, LG)$_{device}$, along with the received mobile device ID information, to location server 140 through MSC 131. Server 140 uses the received location and ID information to provide the mobile device with location-based services in a usual manner.

The foregoing merely illustrates the principles of the invention. It will thus be appreciated that those skilled in the art will be able to devise numerous arrangements which embody the principles of the invention and are thus within its spirit and scope.

For example, in the disclosed embodiment, the location of a base station (e.g., base station 117) is used as a reference point or position to which the relative location of a mobile device served thereby is determined. It will be appreciated that a person skilled in the art may apply the present invention using a different reference point in the wireless communication system 100 to determine the relative location of a mobile device to suit his/her particular needs.

Finally, although wireless communication system 100 is embodied in the form of various discrete functional blocks, these systems could equally well be embodied in an arrangement in which the functions of any one or more of those blocks or indeed, all of the functions thereof, are realized, for example, by one or more appropriately programmed processors or devices.

What is claimed is:

1. An apparatus comprising:
   transmitter for broadcasting a given position of the apparatus to a plurality of the plurality of mobile devices, the at least a plurality of the mobile devices including a target mobile device and the given position being formatted in accordance with a selected coordinate system;
   a receiver for receiving via a wireless medium from the target mobile device first information, the first information indicating a direction and a distance of the target mobile device relative to the given position; and
   a controller configured to determine second information, concerning a location of the target mobile device based at least on the received first information, and data concerning the given position,
   wherein the second information defines the location of the target mobile device in accordance with the selected coordinate system; and
   wherein the first information is formatted in a different format than the second information.

2. The apparatus of claim 1 wherein the first information is formatted in a plurality of data elements representing the relative location of the target mobile device.

3. The apparatus of claim 2 wherein at least one of the data elements indicates the direction and the distance.

4. The apparatus of claim 1 wherein the second information is formatted in a GPS data format.

5. The apparatus of claim 1 wherein the data concerning the given position is formatted in a GPS data format.

6. The apparatus of claim 1 wherein the second information is determined also based on data concerning a distance resolution.

7. Apparatus capable of wireless communications through a wireless communication system, comprising:
   a receiving portion for receiving via a wireless medium first information, concerning a given position in the wireless communication system in accordance with a selected coordinate system;
   a location device for providing second information, concerning a location of the apparatus in accordance with the selected coordinate system;
   a processing element configured to generate data concerning the location of the apparatus relative to the given position based at least on the first and second information, the data indicating a direction and a distance and being formatted in a different format than the second information; and
   a transmitting portion for transmitting the generated data;
   wherein the first information and the second information are not representative of the same location in the wireless communication system.

8. The apparatus of claim 7 wherein the first information is formatted in a GPS data format.

9. The apparatus of claim 7 wherein the location device comprises a GPS receiver for receiving satellite signals.

10. The apparatus of claim 7 wherein the given position is a position of a base station.

11. The apparatus of claim 7 wherein the data is generated also based on data concerning a distance resolution.

12. The apparatus of claim 7 wherein the data is formatted in a plurality of data elements, at least one of which indicates the direction and the distance.

13. A method for serving a plurality of mobile devices, comprising:
   broadcasting a given position of a base station to a plurality of the plurality of mobile devices, the at least a plurality of the mobile devices including a target mobile device and the given position being formatted in accordance with a selected coordinate system;
   receiving via a wireless medium from the target mobile device first information, the first information indicating a direction and a distance of the target mobile device relative to a given position; and
   determining second information, concerning a location of the target mobile device based on the received first information, and data concerning the given position,
   wherein the second information defines the location of the target mobile device in accordance with the selected coordinate system; and
   wherein the first information is formatted in a different format than the second information.

14. The method of claim 13 wherein the first information is formatted in a plurality of data elements representing the relative location of the target mobile device.

15. The method of claim 14 wherein at least one of the data elements indicates the direction and the distance.

16. The method of claim 13 wherein the second information is formatted in a GPS data format.

17. The method of claim 13 wherein the data concerning the given position is formatted in a GPS data format.

18. The method of claim 13 wherein the second information is determined also based on data concerning a distance resolution.

* * * * *